UNITED STATES PATENT OFFICE.

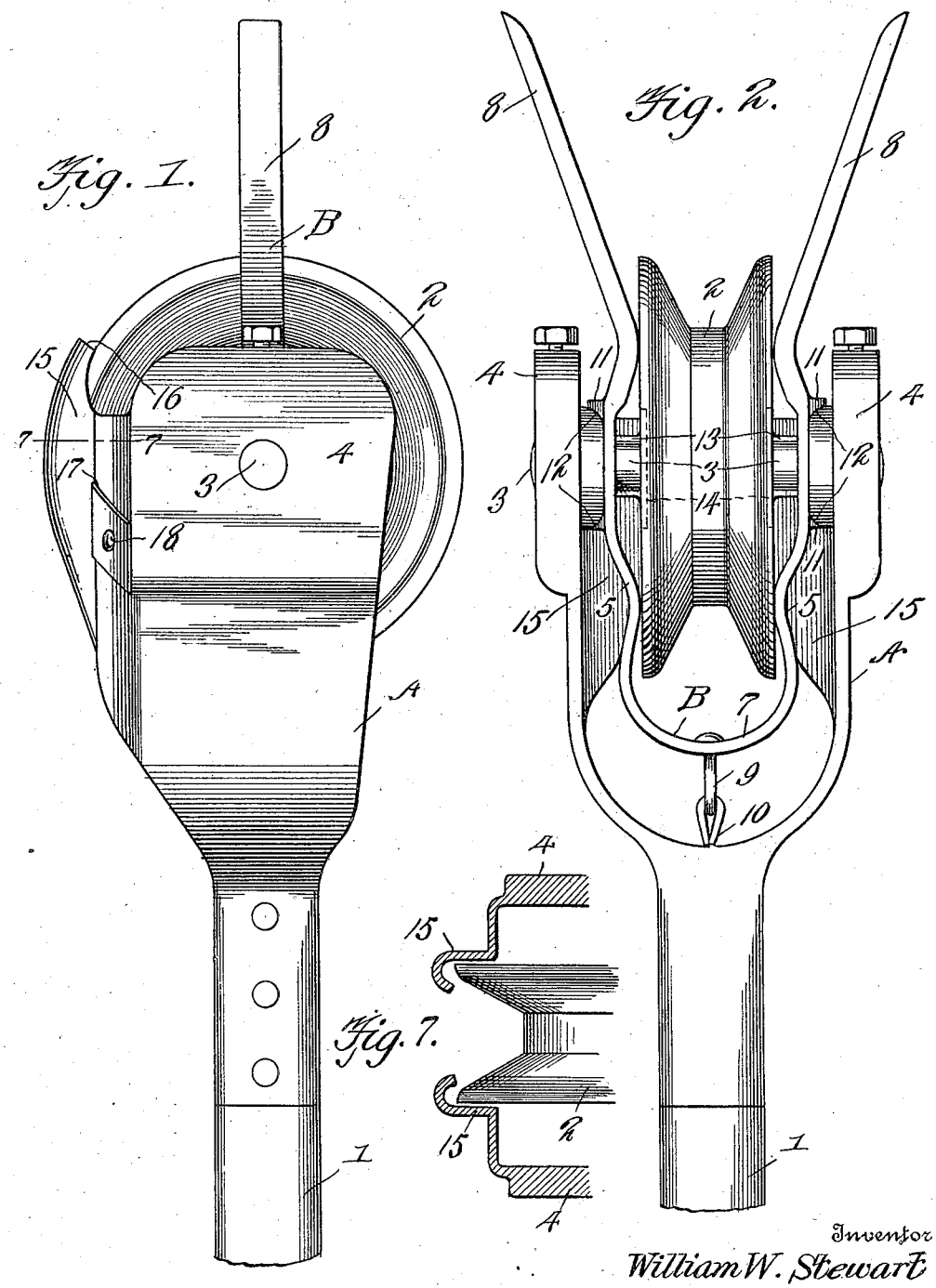

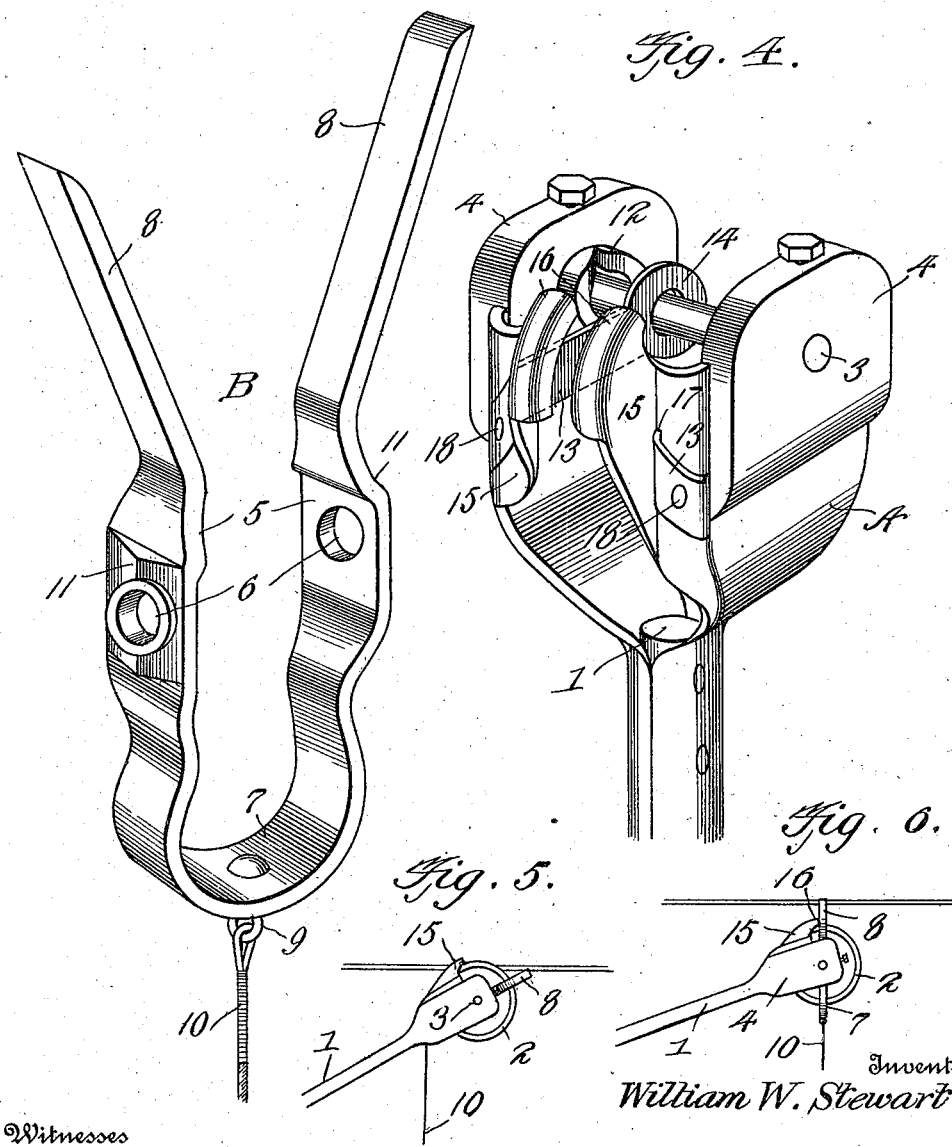

WILLIAM W. STEWART, OF MUSKOGEE, OKLAHOMA.

TROLLEY-HARP.

974,611.  Specification of Letters Patent.  Patented Nov. 1, 1910.

Application filed March 16, 1910. Serial No. 549,628.

*To all whom it may concern:*

Be it known that I, WILLIAM W. STEWART, a citizen of the United States, residing at Muskogee, in the county of Muskogee and State of Oklahoma, have invented new and useful Improvements in Trolley-Harps, of which the following is a specification.

This invention relates to trolley harps and more particularly to means for enabling the trolley wheel or current collecting device to be guided to the overhead wire in the act of replacing the wheel whenever the same has been taken off the wire, as, for instance, when the car has reached the end of its trip and the trolley pole is reversed for the return trip.

The invention has for one of its objects to provide a novel form of device for trolley harps which is normally held in inoperative position and is adapted to be projected to operative position by a downward pull on the trolley pole ropes, so that the trolley wheel will be reliably guided to the wire.

Another object of the invention is the provision of co-acting cam surfaces between the said guiding device and trolley harp for causing the device to return to its normal inoperative position when the pull on the trolley rope is released.

A further object is to improve the construction of the trolley harp so as to more effectively retain the overhead wire on the wheel, especially when the car is passing around curves.

With these objects in view, and others as will appear as the description proceeds, the invention comprises the various novel features of construction and arrangement of parts which will be more fully described hereinafter and set forth with particularity in the claims appended hereto.

In the accompanying drawings, which illustrate one embodiment of the invention; Figure 1 is a side view of the trolley harp shown in upright position. Fig. 2 is a rear view of Fig. 1. Fig. 3 is a perspective view of the guiding or replacing device. Fig. 4 is a perspective view of the trolley harp. Fig. 5 is a view showing the normal position of the guiding or replacing device with respect to the trolley wire. Fig. 6 is a similar view showing the guiding or replacing device in operative position. Fig. 7 is a detail sectional view on line 7—7 of Fig. 1.

Similar reference characters are employed to designate corresponding parts throughout the several views.

Referring to the drawings, A designates a trolley harp, which is mounted as usual on the upper end of a conductor pole 1 and in the harp is the usual wheel 2 mounted for rotation on a fixed axle 3 that has its ends supported in the arms 4 of the harp.

Mounted in the harp is a guiding or replacing device, designated generally by B, which is in the form of a fork or U-shaped structure having side members 5, which are capable of inward and outward yielding movement, and these arms are provided with openings 6 through which the axle 3 extends, the axle thus forming a support for the device B. The members 5 are disposed between the sides of the wheel 2 and arms 4 of the harp, and sufficient space is provided for the free lateral movement of the members 5. The lower ends of these members 5 are connected by an approximately semi-circular resilient portion 7, which is preferably integral with the said members, and the latter have their free ends formed into outwardly diverging fingers 8 at opposite sides of the wheel so that when the device is moved to operative position, one finger or the other will engage the trolley wire and cause the latter to slide along the finger and finally enter the groove of the wheel in the act of placing the wheel on the wire. Connected with the resilient portion 7 is an eye 9 or equivalent device for connection with the rope or cable 10 by which the trolley pole is controlled and when a downward pull is exerted on this rope in opposition to the tension of the erectile spring of the trolley pole, the device B will be thrown from the position shown in Fig. 5 to that shown in Fig. 6. When the downward pull is removed from the rope 10, the device B is adapted to return automatically to its normal position. The automatic return of the device B is effected by co-acting cam surfaces between the side members 5 of the guiding device B and arms 4 of the trolley harp. The cam surfaces are arranged at 11 on the device B at the openings 6 where the axle passes through the device and the projection formed by the cam surfaces 11 entering recesses 12 on the arms 4 of the trolley harp, the said recesses being shaped to conform to the projections 11. When the device B is in the position shown in Figs. 2 and 5, the projections 11 are seated in the recesses 12 and when the device B is thrown to operative position, the members 5 will be moved toward each other against the tension of the spring portion 7, because of the coacting cam surfaces between the device and trolley harp, and as soon as the pull is released from the rope 11, the tension of the connecting portion 7 of the members 5 will cause the projections 11 to slide back into the recesses 12.

In order to permit of the inward movement of the side members 5, of the device B there must be clearance at opposite sides of the trolley wheel and to prevent free lateral movement of the trolley wheel on the axle and to hold the wheel out of engagement with the device B, the harp is provided with spring members 13 which have annular terminal portions 14 that engage the hub of the wheel, the said members being preferably made of copper so that in addition to their centering the wheel, act as brushes for effecting a good electric connection between the wheel and harp. The front edges of the arms 4 of the harp are provided with inwardly extending flanges 15 that terminate at the periphery of the wheel adjacent the top thereof when the wheel is riding under the trolley wire. The inner portions 16 of these flanges overhang the flanges of the wheel and extend partially into the groove of the latter so that they prevent the trolley wire from riding out of the groove of the wheel when the car passes around curves in the track, and in addition to these functions, the said portions 16 form stops for limiting the upward movement of the guiding or replacing device B when the same is projected to operative position. It will be obvious that the connecting curved portion 7 of the device B is disposed under the harp when the said device is in operative position as shown in Fig. 6, and this curved portion prevents the wire from being caught under the harp or wheel when the trolley pole is lowered from a point above the trolley wire, as when the trolley has jumped off the wire.

The members 15 are provided with openings 17 through which the copper members 13 extend, the said ends being bent laterally against the flanges 15 and secured to the latter by rivets 18.

From the foregoing description taken in connection with the accompanying drawing, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim as new and desire to secure by Letters Patent is:—

1. The combination of a trolley harp including spaced arms, an axle supported by the arms, a wheel on the axle, a replacing device pivotally mounted on the axle and consisting of resiliently connected arms, means between the arms of the device and harp whereby the resiliency of the device maintains the same yieldingly in inoperative position and automatically returns it to such position, means connected with the device for throwing the same to operative position, and fixed members on the harp arranged over the upper front portions of the wheel and spaced apart a fixed distance to permit the trolley wire to enter between them, said members serving as retainers for the wire and forming stops for the device when in operative position.

2. The combination of a trolley harp including spaced arms, an axle supported by the arms, a wheel on the axle, a replacing device pivotally mounted on the axle and consisting of resiliently connected arms disposed between the arms of the harp and wheel, means between the arms of the device and harp whereby the resiliency of the device maintains the same yieldingly in inoperative position and automatically returns it to such position, means connected with the device for throwing the same to operative position, and members on the harp arranged to form stops for the device when in operative position, said members being fixed on the harp and permanently arranged to extend inwardly over the top of the wheel from opposite sides to retain the wheel on the trolley wire.

3. The combination of a trolley harp including spaced arms, an axle supported by the arms, a wheel on the axle, a replacing device pivotally mounted on the axle and consisting of resiliently connected arms, means between the arms of the device and harp whereby the resiliency of the device maintains the same yieldingly in inoperative position and automatically returns it to such position, means connected with the device for throwing the same to operative position, members on the harp arranged to form stops for the device when in operative position, said members being integral with the harp and arranged to extend inwardly over the top of the wheel from opposite sides to retain the wheel on the trolley wire, and current conducting springs connected with and supported by the said arms of the harp and engaging opposite sides of the wheel.

4. The combination of a U-shaped trolley harp, a wheel mounted therein, a U-shaped replacing device mounted in the harp and consisting of a single piece forming the two side members connected by resilient portions and having their free extremities formed into outwardly diverging wire engaging fingers, cam surfaces on the harp engaging the members of the device for pressing the members toward each other when they are moved from normal position to automatically effect the return of the device when the latter is released, said surfaces having openings, an axle on the harp for the wheel, said axle extending through the said openings to support the replacing device, and means connected with the device for throwing the same to operative position.

5. The combination of a harp consisting of spaced arms, an axle on the arms, recesses on the inner faces of the arms, a wheel on the axle, a pair of connected members disposed each between one side of the wheel and adjacent arm of the harp, each member having a projection normally engaging in the recess of the adjacent arm, and means acting through the members for yieldingly holding the projections in the recesses, and a rope connected with the members to form an actuator therefor, and for guiding the movement of the trolley harp.

In testimony whereof I affix my signature in presence of two witnesses.

WILLIAM W. STEWART.

Witnesses:
J. E. WYAND,
CHAS. A. MOON.